United States Patent
Watanabe et al.

(10) Patent No.: US 9,927,781 B2
(45) Date of Patent: Mar. 27, 2018

(54) MANAGEMENT OF A GRAPHICAL USER INTERFACE TO BE DISPLAYED ON A DISPLAY OF AN IMAGE FORMING APPARATUS

(71) Applicants: KABUSHIKI KAISHA TOSHIBA, Tokyo (JP); Toshiba Tec Kabushiki Kaisha, Tokyo (JP)

(72) Inventors: Naoki Watanabe, Tokyo (JP); Tomonori Ikumi, Shizuoka (JP); Mika Hirama, Tokyo (JP); Masami Takahata, Tokyo (JP); Akihiko Fujiwara, Kanagawa (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 1241 days.

(21) Appl. No.: 13/957,344

(22) Filed: Aug. 1, 2013

(65) Prior Publication Data
US 2014/0067093 A1    Mar. 6, 2014

(30) Foreign Application Priority Data
Aug. 31, 2012    (JP) .................. 2012-191337

(51) Int. Cl.
G05B 15/00    (2006.01)
G05B 15/02    (2006.01)
G06F 3/12    (2006.01)

(52) U.S. Cl.
CPC ............ G05B 15/02 (2013.01); G06F 3/122 (2013.01); G06F 3/1232 (2013.01);
(Continued)

(58) Field of Classification Search
None
See application file for complete search history.

(56) References Cited

U.S. PATENT DOCUMENTS

8,654,381 B2 *  2/2014  Kurumasa .......... H04N 1/00204
                                                    358/1.14
2004/0056897 A1    3/2004  Ueda
(Continued)

FOREIGN PATENT DOCUMENTS

JP    H10-166622    6/1998
JP    2000-357070    12/2000
(Continued)

OTHER PUBLICATIONS

Office Action dated Apr. 1, 2014, filed in corresponding Japanese Patent Application No. 2012-191337, with English translation.
(Continued)

*Primary Examiner* — Wissam Rashid
(74) *Attorney, Agent, or Firm* — Patterson & Sheridan, LLP

(57) ABSTRACT

A management apparatus according to embodiments is configured to manage a processing apparatus having an operation display. The management apparatus includes a request acquisition unit configured to receive a request for screen information used to generate an operation display, from the processing apparatus, a function acquisition unit configured to acquire from the processing apparatus function information indicating one or more functions supported by the processing apparatus, a generating unit configured to generate, based on the function information, the screen information such that a function not supported by the processing apparatus cannot be selected on the operation display, and a provision unit configured to provide the screen information generated by the generating unit to the processing apparatus.

20 Claims, 7 Drawing Sheets

(52) U.S. Cl.
CPC .......... *G06F 3/1271* (2013.01); *G06F 3/1285* (2013.01); *G06F 3/1205* (2013.01); *G06F 3/1253* (2013.01)

(56) References Cited

U.S. PATENT DOCUMENTS

2004/0213614 A1* 10/2004 Uchida ................ G06F 3/1205
400/62
2006/0095445 A1* 5/2006 Fukao ................... G06F 21/608
2008/0016450 A1* 1/2008 Aono ................ H04N 1/00413
715/747

FOREIGN PATENT DOCUMENTS

| JP | 2002-023879 | 1/2002 |
| JP | 2007-156614 | 6/2007 |
| JP | 2009-181382 | 8/2009 |

OTHER PUBLICATIONS

U.S. Appl. No. 13/942,485, filed Jul. 15, 2013, entitled "Server Apparatus and Control Method Thereof".
U.S. Appl. No. 13/928,003, filed Jun. 26, 2013, entitled "Printing System Including a Server That Generates User Interfaces for a Control Panel of the Printing System".
U.S. Appl. No. 13/957,384, filed Aug. 1, 2013, entitled "Server System of a Printing System".

* cited by examiner

MANAGEMENT OF A GRAPHICAL USER INTERFACE TO BE DISPLAYED ON A DISPLAY OF AN IMAGE FORMING APPARATUS

CROSS-REFERENCE TO RELATED APPLICATION

This application is based upon and claims the benefit of priority from Japanese Patent Application No. 2012-191337, filed Aug. 31, 2012, the entire contents of which are incorporated herein by reference.

FIELD

Embodiments described herein relate to a management apparatus configured to manage a processing apparatus having an operation display and a method of managing the processing apparatus.

BACKGROUND

There are various information processing systems comprising processing terminals and a management apparatus that manages the processing terminals through a network. Such information processing systems include a printing system including an image forming apparatus (e.g. MFP (Multi Function Peripheral) and a management server.

Most of the processing terminals such as an image forming apparatus and the like in the printing system include a display on which various operation screens (UI (user interface)) such as a print setting screen are displayed. The data of the screen to be displayed on the display may be stored in a storage area of the processing terminal or provided to a processing terminal from the management apparatus through the network.

DETAILED DESCRIPTION

In accordance with an embodiment, a management apparatus is configured to manage a processing apparatus having an operation display. The management apparatus includes a request acquisition unit configured to receive a request for screen information used to generate an operation display, from the processing apparatus, a function acquisition unit configured to acquire from the processing apparatus function information indicating one or more functions supported by the processing apparatus, a generating unit configured to generate, based on the function information, the screen information such that a function not supported by the processing apparatus cannot be selected on the operation display, and a provision unit configured to provide the screen information generated by the generating unit to the processing apparatus.

Embodiments of the present invention are described below in detail with reference to accompanying drawings.

Figure 1:
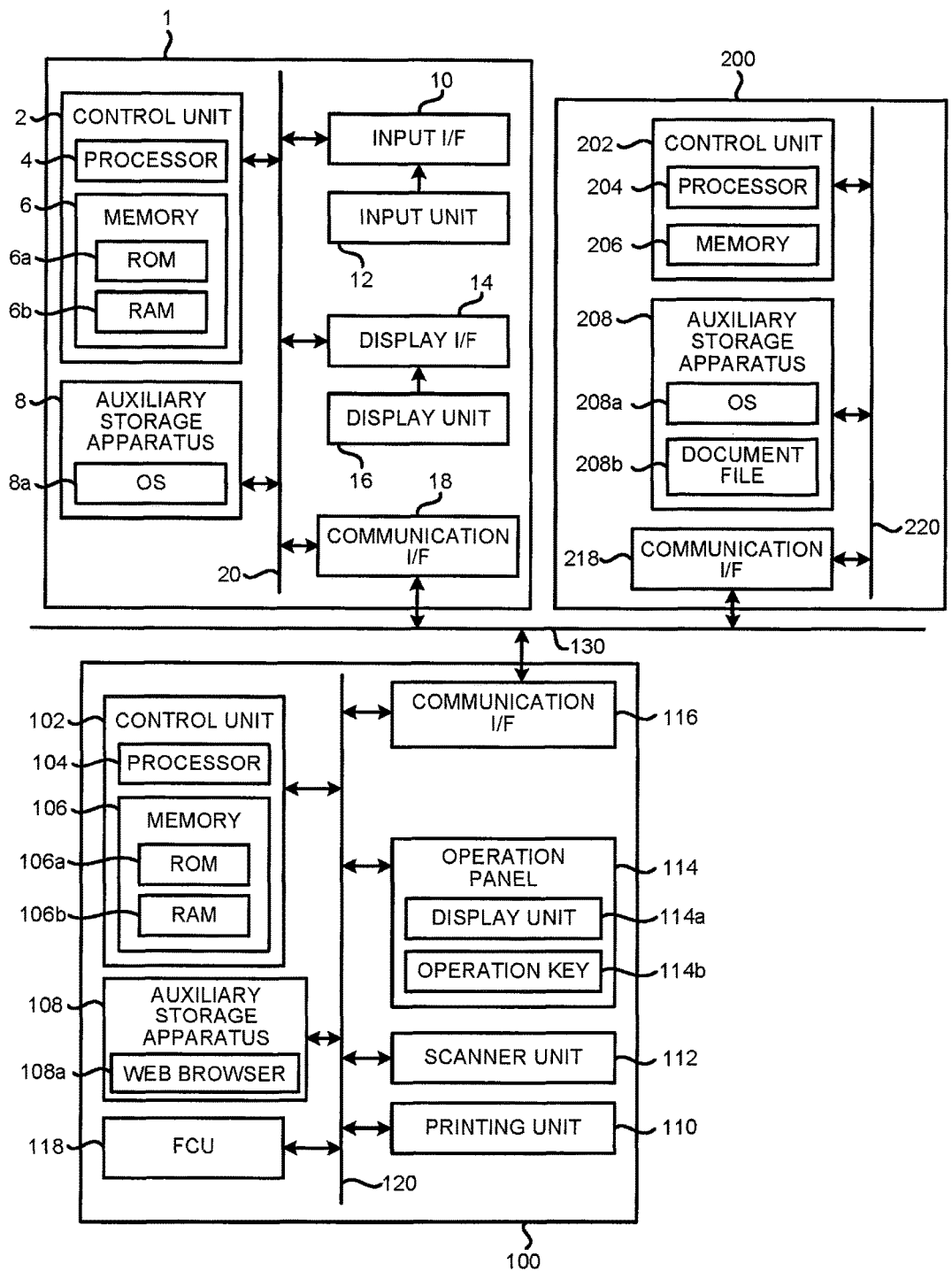
FIG. 1 is a diagram illustrating a configuration of a printing system.

FIG. 1 is a diagram illustrating a configuration of a printing system as an information processing system according to an embodiment. In accordance with the embodiment, the printing system comprises a management server 1 serving as a management apparatus, an image forming apparatus 100 serving as a processing apparatus and a document server 200, which are connected with each other through a network 130. In accordance with the embodiment, the printing system is a system in which the management server 1 acquires the specified document data from the document server 200, outputs the acquired document data to the image forming apparatus 100 that carries out printing, in a condition that the user instructs the image forming apparatus 100 to select and print a specific document. Moreover, the management server 1 may provide the image forming apparatus 100 with the data of an operation screen (user interface (UI)), on which a print setting and the like is carried out, to be displayed on the display unit 114a of the image forming apparatus 100 and control the display unit to display the operation screen. Each configuration of the printing system according to the embodiment is described below.

The configuration of the management server 1 is described first. The management server 1 is a server apparatus in the printing system of the embodiment for managing print processing. The management server 1 comprises a control unit 2, an auxiliary storage apparatus 8, an input interface (input I/F) 10, an input unit 12, a display interface (display I/F) 14, a display unit 16, and a communication interface (communication I/F) 18, which are connected with each other through a bus line 20. Further, the management server 1 may be a general PC (Personal Computer) or a specialized server apparatus.

The control unit 2 controls the various processing carried out by the management server 1. In the embodiment, the control unit 2 manages a series of print processing carried out by the image forming apparatus 100. The control unit 2 comprises a processor 4 and a memory 6. The control unit 2 functions using the processor 4, the memory 6, and an OS (Operating System) 8a.

The processor 4 executes a print management program stored in the memory 6 (or the auxiliary storage apparatus 8) to carry out print management processing. The processor 4 is, for example, a CPU (Central Processing Unit) or a MPU (Micro Processing Unit).

The memory 6, which is, for example, a semiconductor memory, comprises a ROM (Read Only Memory) 6a for storing a control program of the processor 4 and a RAM (Random Access Memory) 6b for providing a temporary working area to the processor 4.

Further, the control unit 2 may include an ASIC (Application Specific Integrated Circuit) performing all or part of the functions of the management server 1. For example, part of or all the functions of the embodiment performed by the processor 4 executing the programs may be performed by the ASIC.

The OS 8a, namely, a program for managing the whole system of the management server 1, and other programs are stored in the auxiliary storage apparatus 8. Further, various kinds of information necessary for print processing management are stored in the auxiliary storage apparatus 8. A print management program may also be stored in the auxiliary storage apparatus 8. The auxiliary storage apparatus 8 may be a hard disc drive, another magnetic storage apparatus, an optical storage apparatus, a semiconductor storage apparatus such as a flash memory, or any combination thereof.

The input I/F 10 is an interface for connecting an input unit 12, which is a pointing device such as a keyboard or mouse, or an input device such as a touch panel, to the bus line 20 or may include two or more of such pointing devices or input devices. The display I/F 14 is an interface for connecting a display unit 16, on which output data is displayed, to the bus line 20. The display unit 16 is, for example, a display or touch panel which is a part of a PC. Further, as the management server 1 is utilized as a server apparatus but not as a PC, the management server 1 may not include the input unit 12 and the display unit 16.

The communication I/F 18 is an interface for connecting an external apparatus to the bus line 20. The communication I/F 18 communicates with an external apparatus (e.g. image forming apparatus 100, document server 200) through the network 130 using a proper wireless communication based on IEEE802.15, IEEE802.11, IEEE802.3, or IEEE1284, such as Bluetooth (registered trademark), infrared connection, and optical connection, or using a wired communication such as USB.

Next, the configuration of the image forming apparatus 100 is described. The image forming apparatus 100 is a MFP (Multi Function Peripheral) capable of carrying out multiple types of image forming processing such as 'print', 'copy', and 'scan'. The image forming apparatus 100 comprises a control unit 102, an auxiliary storage apparatus 108, a printing unit 110, a scanner unit 112, an operation panel 114, a communication interface (communication I/F) 116, and a fax control unit (FCU) 118, which are connected through the bus line 120.

The control unit 102 controls various kinds of processing executed by the image forming apparatus 100. The control unit 102 functions using the processor 104, the memory 106, and an OS (not shown in FIG. 1). The processor 104 is a CPU or MPU. The memory 106 is, for example, a semiconductor memory and includes a ROM 106*a* and a RAM 106*b*, like the management server 1 does.

The control unit 102 controls the printing unit 110, the scanner unit 112, the operation panel 114, the communication I/F 116, and the FCU 118, and the like, based on a control program stored in the ROM 106*a* or the auxiliary storage apparatus 108. Further, the control unit 102 may further include an ASIC (Application Specific Integrated Circuit) for performing all or part of the functions of the image forming apparatus 100.

Application programs and the OS are stored in the auxiliary storage apparatus 108. The application programs include programs for executing the functions of the image forming apparatus 100, such as a copying function, a printing function, a scanning function, a fax function, and a network file function. The auxiliary storage apparatus 108 of this embodiment further includes a web browser 108*a* serving as an application for a Web client. In this embodiment, the web browser 108*a* is used to display a print setting screen on the display unit 114*a* of the image forming apparatus 100. The display processing of the setting screen is described below in detail.

The image data generated by the scanner unit 112 reading an original and the data acquired from an external apparatus through the network 130 are stored in the auxiliary storage apparatus 108, or an acquired printing job may be temporarily stored in the auxiliary storage apparatus 108 until the printing job is executed. The auxiliary storage apparatus 108 may be, for example, a magnetic storage apparatus such as a hard disc drive, an optical storage apparatus, a semiconductor storage apparatus (e.g. flash memory), or any combination thereof.

The printing unit 110 executes a print job output from the management server 1 to form an image on a sheet. In addition, like in the common image forming apparatus, the image corresponding to the image data of the original read by the scanner unit 112 or the image output from a client through the network 130 is formed on a sheet.

The scanner unit 112 includes an internal scanning and reading unit for reading the original as an image, an original placing table and an automatic original feeding apparatus for conveying the original to a reading position. The scanning and reading unit of the scanner unit 112 reads the original placed on the original placing table or the automatic original feeding apparatus.

The operation panel 114 includes a display unit 114*a* of touch-panel-type and various operation keys 114*b*. Instruction items related to printing conditions, such as sheet size, copy number, printing density, and ornament (staple, fold) are displayed on the display unit 114*a*. The operation keys 114*b* include, for example, numeric keys, a reset key, a stop key, and a start key. The user operates the image forming apparatus 100 using the display unit 114*a* or the operation keys 114*b*. Further, in the embodiment, the screens displayed on the display unit 114*a* include a UI screen acquired from the management server 1 using the function of the web browser 108*a*.

The communication I/F 116 is an interface for connecting the image forming apparatus 100 with an external apparatus such as the management server 1 and the like through the network 130. The communication I/F 116 is connected with an external apparatus through the network 130 using a proper wireless communication based on IEEE802.15, IEEE802.11, IEEE802.3, or IEEE1284 such as Bluetooth (registered trademark), infrared connection and optical connection or using a wired communication. The communication I/F 116 includes a buffer in which all or part of the data received through the network 130 is stored temporarily.

The fax control unit (FCU) 118 controls the fax sending processing and fax receiving processing of the image forming apparatus 100.

Then, the configuration of the document server 200 is described. The document server 200 stores a document to be printed by the printing system of the embodiment and provides the document to be available on the network 130. The document server 200 includes a control unit 202, an auxiliary storage apparatus 208, and a communication interface (communication I/F) 218, which are connected through the bus line 220.

The control unit 202 functions using a processor 204 including a CPU or MPU, a memory 206, and an OS 208*a*. The processor 204 executes a document file management program stored in the memory 206 (or the auxiliary storage apparatus 208) to manage a document file. The memory 206, which is, for example, a semiconductor memory, comprises a ROM 206*a* for storing a control program of the processor 204 and a RAM 206*b* for providing a temporary working area for the processor 204.

The OS 208*a* and other programs are stored in the auxiliary storage apparatus 208. The auxiliary storage apparatus 208 of the embodiment further stores document files used in the printing system. Like other apparatus, the auxiliary storage apparatus 208 may be a hard disc drive, another magnetic storage apparatus, an optical storage apparatus, a semiconductor storage apparatus such as a flash memory, or any combination thereof.

The communication I/F 218 is an interface for connecting an external apparatus to the bus line 220. Like the communication I/F 18 of the management server 1, the communication I/F 218 communicates with the management server 1, the image forming apparatus 100, or other external apparatuses through the network 130 using a wireless communication or wired communication.

Above is a description with respect to the configuration of the document server 200 of the embodiment. Additionally, the document server 200 is required to be capable of at least storing document files and therefore may not be included in a server apparatus. For example, the document server 200 may be a hard disc drive connected through the network 130. Further, if document files are stored in the auxiliary storage apparatus (8 or 108) of the management server 1 or the image forming apparatus 100, the document server 200 may be omitted.

Above is a description with respect to the apparatuses constituting the printing system of the embodiment. The network 130 connecting the apparatuses may be any network that enables the communication among the apparatuses or may be a LAN (Local Area Network), a WAN (Wide Area Network) or the Internet.

Figure 2:
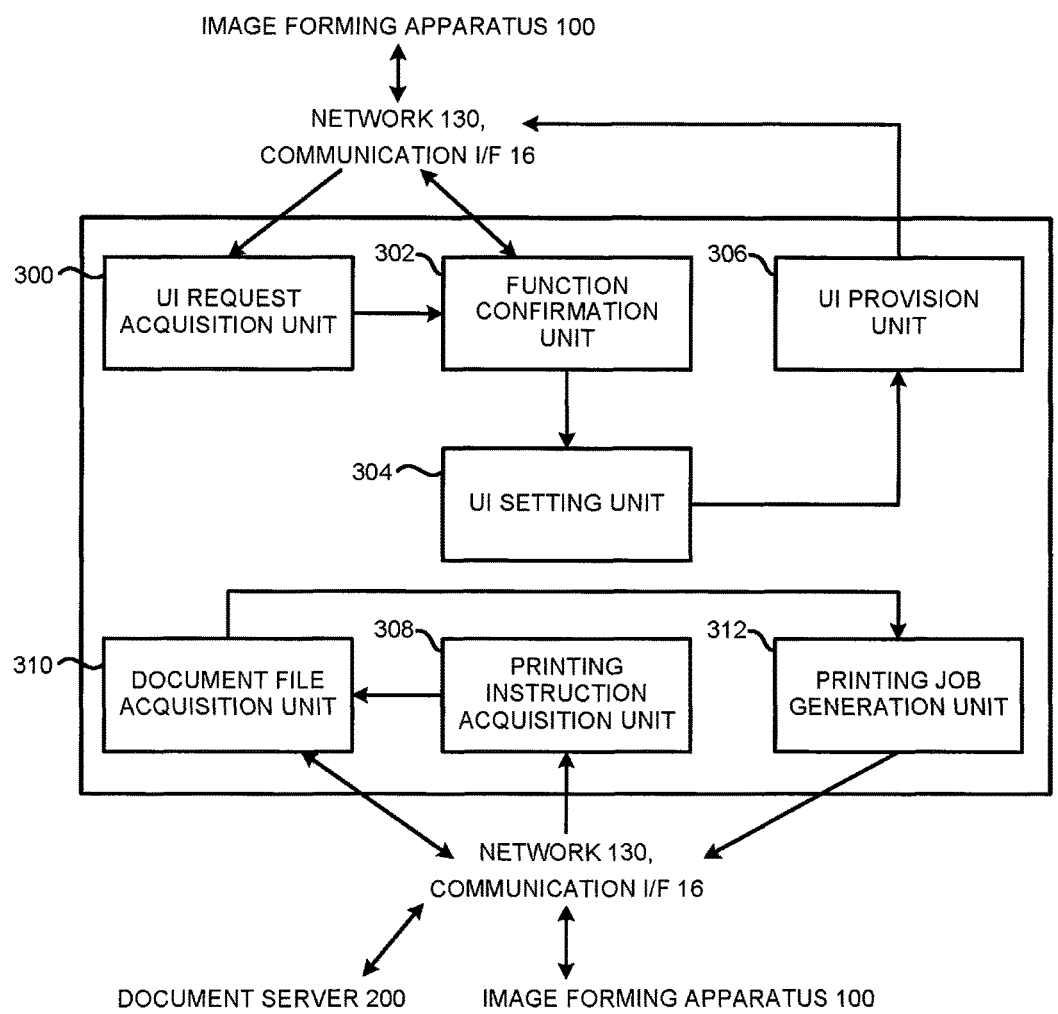
FIG. 2 is a functional block diagram illustrating a management server in the printing system.

Then, the printing processing method of the printing system according to the embodiment is described below. The functions of the management server 1 are described first. FIG. 2 is a functional block diagram illustrating the management server 1. The management server 1 comprises a UI request acquisition unit 300, a function confirmation unit 302, a UI setting unit 304, a UI provision unit 306, a printing instruction acquisition unit 308, a document file acquisition unit 310, and a printing job generating unit 312. These functions are performed by the control unit 2 executing the programs stored in the memory 6. Further, the control unit 2 further comprises an ASIC for performing all or part of the functions.

The UI request acquisition unit 300 acquires a request for the data necessary for the display of a UI screen from the image forming apparatus 100 through the network 130. The UI is, for example, an operation screen such as a print setting screen displayed on the display unit 114a of the image forming apparatus 100. In the embodiment, the UI request to be received by the UI request acquisition unit 300 is sent to the management server 1 from the image forming apparatus 100 using the function of the web browser 108a of the image forming apparatus 100 in accordance with a HTTP (Hyper Text Transfer Protocol).

In order to provide the image forming apparatus 100 with a proper UI corresponding to functions of the image forming apparatus 100, the function confirmation unit 302 carries out a processing of confirming the functions supported by the image forming apparatus 100. Specifically, the function confirmation unit 302 analyzes, when a UI request is received by the UI request acquisition unit 300 from the image forming apparatus 100, the UI request to identify the image forming apparatus 100. The identification on the image forming apparatus 100 may be carried out using an IP address included in the UI request. Moreover, the function confirmation unit 302 sends a request for information (function information) with respect to whether or not one or more function for printing are supported by the identified image forming apparatus 100. The function confirmation unit 302 identifies, if function information is acquired from the image forming apparatus 100 as a response for the request for the function information (function information request), one or more functions related to printing supported by the image forming apparatus 100 based on the function information.

Herein, the functions of the image forming apparatus 100 confirmed by the function confirmation unit 302 refer to functions set in a print setting, for example, duplex printing, staple, hole-punch, Nin1-printing (allocation printing), and color/monochrome printing. Depending on the basic functions (monochrome/color and the like) of the main body of the image forming apparatus and an option apparatus (finisher and the like) connected with the image forming apparatus, the image forming apparatus supports a variety of functions.

No specific limitation is given to a method for the function confirmation unit 302 requesting for the function information, for example, like the UI request given by the image forming apparatus 100, the function information may be requested in accordance with HTTP. The image forming apparatus 100 sends the function information with respect to the functions supported by the image forming apparatus 100 to the management server 1 in response to the request for the function information, and the function confirmation unit 302 acquires the function information. The function confirmation unit 302 identified the functions supported by the image forming apparatus 100 based on the function information acquired. As a response, the image forming apparatus 100 sends HTML (Hyper Text Markup Language) data describing function information aiming at the request sent using the HTTP, thus, the function confirmation unit 302 analyzes the HTML data to identify the functions supported by the image forming apparatus 100.

Further, the confirmation of the functions supported by the image forming apparatus 100 may be the confirmation of functions that may be displayed on the printing setting screen. For example, a function for carrying out the function confirmation may be predetermined, and a request is sent to confirm whether or not the function is supported. Further, function information of all functions may be acquired from the image forming apparatus 100, and the function confirmation unit 302 determines whether or not the necessary functions are supported.

The UI setting unit 304 generates a UI screen (the data for displaying) corresponding to the functions supported by the image forming apparatus 100 identified by the function confirmation unit 302. For example, if the image forming apparatus 100 is provided with no finisher for stapling or punching, a screen is displayed on which items 'staple' and 'hole-punch' are grayed out. Further, if the image forming apparatus 100 supports color printing, then a screen on which the selection of either color printing or monochrome printing can be made is generated, and if the image forming apparatus 100 only supports monochrome printing, then a screen on which the selection of color printing cannot be made is generated. In addition to be displayed in a grayed out manner, the function unsupported may not be displayed.

Further, if the image forming apparatus 100 is provided with no finisher for stapling or punching, a screen is preferably generated on which items 'staple' and 'hole-punch' are presented for the user although items 'staple' and 'hole-punch' cannot be selected. For example, if the items 'staple' and 'hole-punch' are displayed in a grayed out manner, then that information effects to indicate the user that the functions can be evoked if a finisher is added.

The UI provision unit 306 sends and provides the data of the UI (UI data) generated by the UI setting unit 304 for the image forming apparatus 100 to use to the image forming apparatus 100. Further, as the UI provision unit 306 sends UI data as a response to the UI request from the image forming apparatus 100, the data must be returned in accordance with the protocol used in the UI request. As stated above, if the UI request is made in accordance with HTTP, then the UI provision unit 306 provides the UI data to the image forming apparatus 100 in accordance with HTTP.

If a print setting is carried out in the image forming apparatus 100 using the UI data provided by the UI provision unit 306 and a printing instruction is finally output from the image forming apparatus 100, the printing instruction acquisition unit 308 acquires the printing instruction, in which the data of the document files designated to be printed and the print setting information set on the print setting screen displayed on the image forming apparatus 100 are contained.

The document file acquisition unit 310 requests and acquires the data of the document file designated in the printing instruction acquired by the printing instruction acquisition unit 308 from the document server 200.

The printing job generating unit 312 converts the acquired data of the document file to data with which the image forming apparatus 100 can execute an image forming processing, generates a printing job containing the data of the object to be printed and the set printing information, and outputs the printing job to the image forming apparatus 100. The image forming apparatus 100 carries out an image forming processing according to the printing job.

Above is the description on the functions of the management server 1 of the embodiment.

Figure 3:
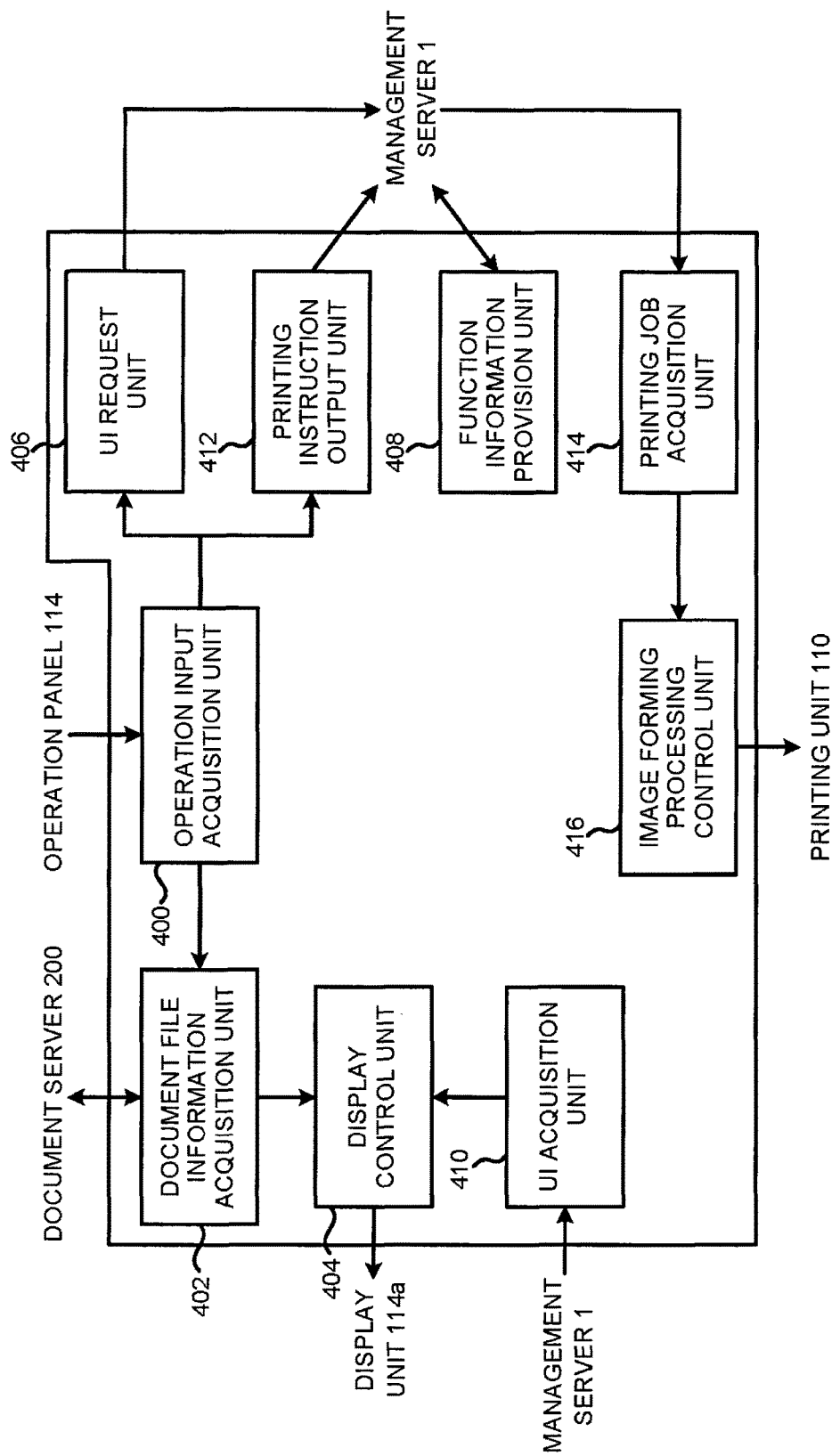
FIG. 3 is a functional block diagram illustrating an image forming apparatus in the printing system.

Next, the functions of the image forming apparatus 100 are described. FIG. 3 is a functional block diagram illustrating functional blocks of the image forming apparatus 100. The image forming apparatus 100 comprises an operation input acquisition unit 400, a document file information acquisition unit 402, a display control unit 404, a UI request unit 406, a function information provision unit 408, a UI acquisition unit 410, a printing instruction output unit 412, a printing job acquisition unit 414, and an image forming processing control unit 416. The functions are performed by the control unit 102 executing the programs stored in the memory 106 and the like, or partially or completely performed by an ASIC if the ASIC is provided. Further, the function of requesting and acquiring a UI data and the function of displaying the UI on a screen are performed by executing the program of the web browser 108a.

The operation input acquisition unit 400 acquires the touch operation of the display unit 114a of the operation panel 114 or the input operation of an operation key 114b.

If an operation to start the printing of a document managed in the document server 200 is made in the image forming apparatus 100, the document file information acquisition unit 402 acquires information of a document file from the document server 200 in such a manner that the document file can be selected on the display unit 114a as an object to be printed. The information of the document file may be a list of the document files managed by the document server 200. Further, a document may be directly selected by showing the data managed by the document server 200 in a tree chart or be retrieved by inputting the name of the file.

The display control unit 404 controls the screen display processing of the display unit 114a. For example, the display control unit 404 controls the display unit 114a to display the list of the document files acquired by the document file information acquisition unit 402 or a UI screen for print setting which will be discussed later.

The UI request unit 406 requests the management server 1 for a UI screen used for the print setting. As shown in the description of the functional blocks of the management server 1, the function of the UI request unit 406 is performed using the function of the web browser 108a, and the UI request unit 406 requests a UI data in accordance with HTTP. Further, the UI request unit 406 requests a UI data to display a print setting screen on the display unit 114a in a case where an operation of selecting and printing a document file is done on the operation panel 114 and the input of the operation is acquired by the operation input acquisition unit 400.

The function information provision unit 408 provides function information indicating the functions supported by the image forming apparatus 100 in response to the function information request when the function confirmation unit 302 of the management server 1 requests the image forming apparatus 100 for the function information. The function information is described as HTML, as stated above.

The UI acquisition unit 410 acquires the data of a UI screen for the print setting from the management server 1. After the data of the UI is acquired by the UI acquisition unit 410, a UI for the print setting is displayed by the display control unit 404 on the display unit 114a.

Figure 4:
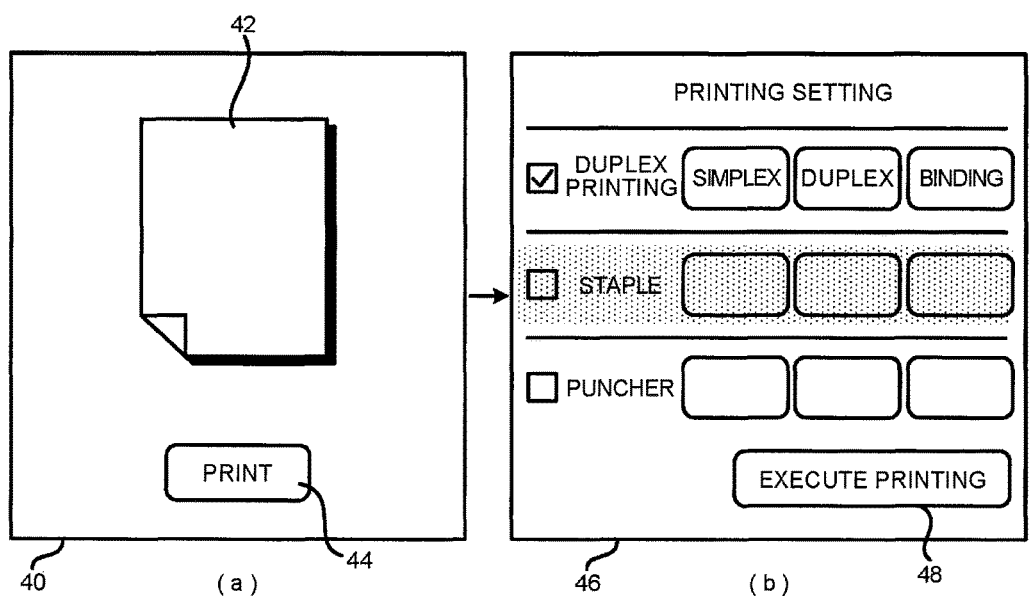
FIG. 4(a) shows an example of a screen displayed when a document is selected as a printing object at the image forming apparatus.
FIG. 4(b) shows an example of a print setting screen provided by the management server.

FIG. 4 shows an example of a screen (FIG. 4(a)) displayed when a document is selected as a printing object in the image forming apparatus 100 and an example of a UI screen (FIG. 4(b)) acquired by the UI acquisition unit 410 from the management server 1. In the image forming apparatus 100, if a document is designated by the user as the object to be printed, then the preview screen 40 shown in FIG. 4(a) is displayed. In the preview screen 40, a preview image 42 is displayed to confirm the content of the designated document. If the user touches a button 'print' 44 on the screen 40, then the image forming apparatus 100 is provided with a suitable UI by functions of the UI request unit 406 to the UI acquisition unit 410.

Then, the print setting screen 46 shown in FIG. 4(b) is displayed on the display unit 114a based on the data of the UI acquired by the UI acquisition unit 410. In the printing setting screen 46, for example, in a case where the image forming apparatus 100 provides no staple function, the item 'staple' is grayed out (displayed as grid lines) to disable the selection on a staple processing. Further, as stated above, through the display, the user is indicated that the staple function is available after an option is added.

The printing instruction output unit 412 sends a printing instruction to the management server 1 when the print setting on the print setting screen of the image forming apparatus 100 ends and a final printing execution is selected on the operation panel 114. On the UI screen exemplarily shown in FIG. 4, if the button 'execute printing' 48 is touched on the touch panel, then the printing instruction output unit 412 sends a printing instruction, which at least contains information designating a document file as the object to be printed and the information set on the printing setting screen 46.

The printing job acquisition unit 414 acquires, from the management server 1, the printing job generated in the management server 1 based on the printing instruction output by the printing instruction output unit 412.

The image forming processing control unit 416 controls the printing unit 110 to carry out an image forming processing corresponding to the printing job acquired by the printing job acquisition unit 414.

Above is description on the functions of the image forming apparatus 100 in the printing system according to the embodiment.

Figure 5:
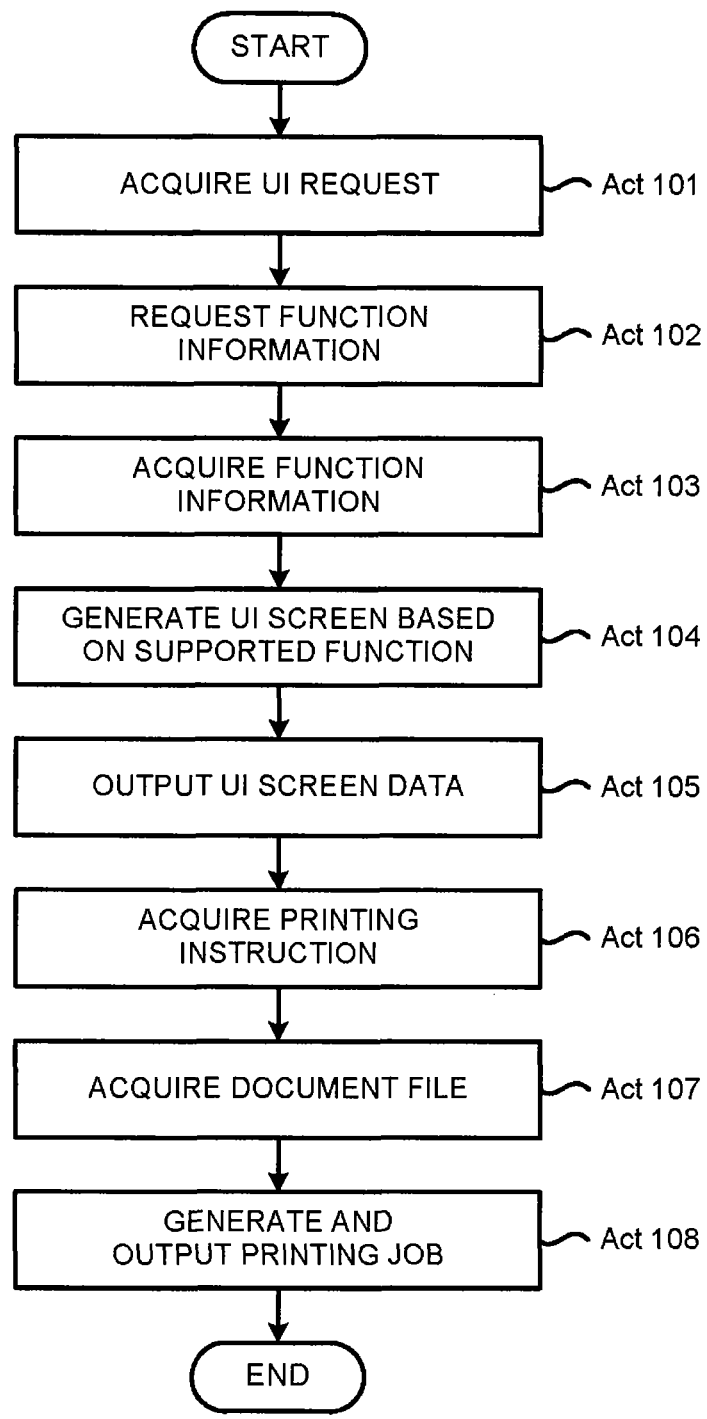
FIG. 5 is a flowchart illustrating a processing flow at the management server.

Then, the flow of the printing processing of the printing system is described. The processing flow of the management server 1 is described first. FIG. 5 is a flowchart illustrating the processing flow of the management server 1.

First, a request for a UI data for a print setting is acquired from the image forming apparatus 100 by the UI request acquisition unit 300 (ACT 101). As stated above, the request for the UI data is sent to the management server 1 by the image forming apparatus 100 in accordance with HTTP.

Then, if there is a request for the UI data, the function confirmation unit 302 requests the image forming apparatus for function information so as to confirm the functions supported by the image forming apparatus 100. Similarly, the request for the function information is sent to the image forming apparatus 100 from the management server 1 in accordance with HTTP. Further, the image forming apparatus 100 is identified according to the IP address contained in the UI request, and the function information request is sent to the identified image forming apparatus 100.

Next, the function confirmation unit 302 acquires the function information output from the image forming apparatus 100 in response to the function information request (ACT 103). For example, as stated above, the function information is HTML data describing the functions supported by the image forming apparatus.

Then, a UI screen (printing setting screen) corresponding to the functions of the image forming apparatus 100 is generated based on the function information acquired by the UI setting unit 304 (ACT 104), and the data of the UI screen generated by the UI provision unit 306 is output to the image forming apparatus 100 (ACT 105).

The processing described so far is a processing flow to provide the UI data. Then, the UI data provided to the image forming apparatus 100 is used to execute print setting, and the printing instruction acquisition unit 310 acquires a printing instruction when the printing instruction is output from the management server 1 (ACT 106).

Next, the document file acquisition unit 310 acquires the data of document file designated in the printing instruction from the document server 200 (ACT 107).

Sequentially, the printing job generating unit 312 converts the data of the document file acquired from the document server 200 to data with which the image forming apparatus 100 can execute an image forming processing, generates a printing job containing the data of the object to be printed and the print setting information, and outputs the printing job to the image forming apparatus 100 (ACT 108).

Figure 6:
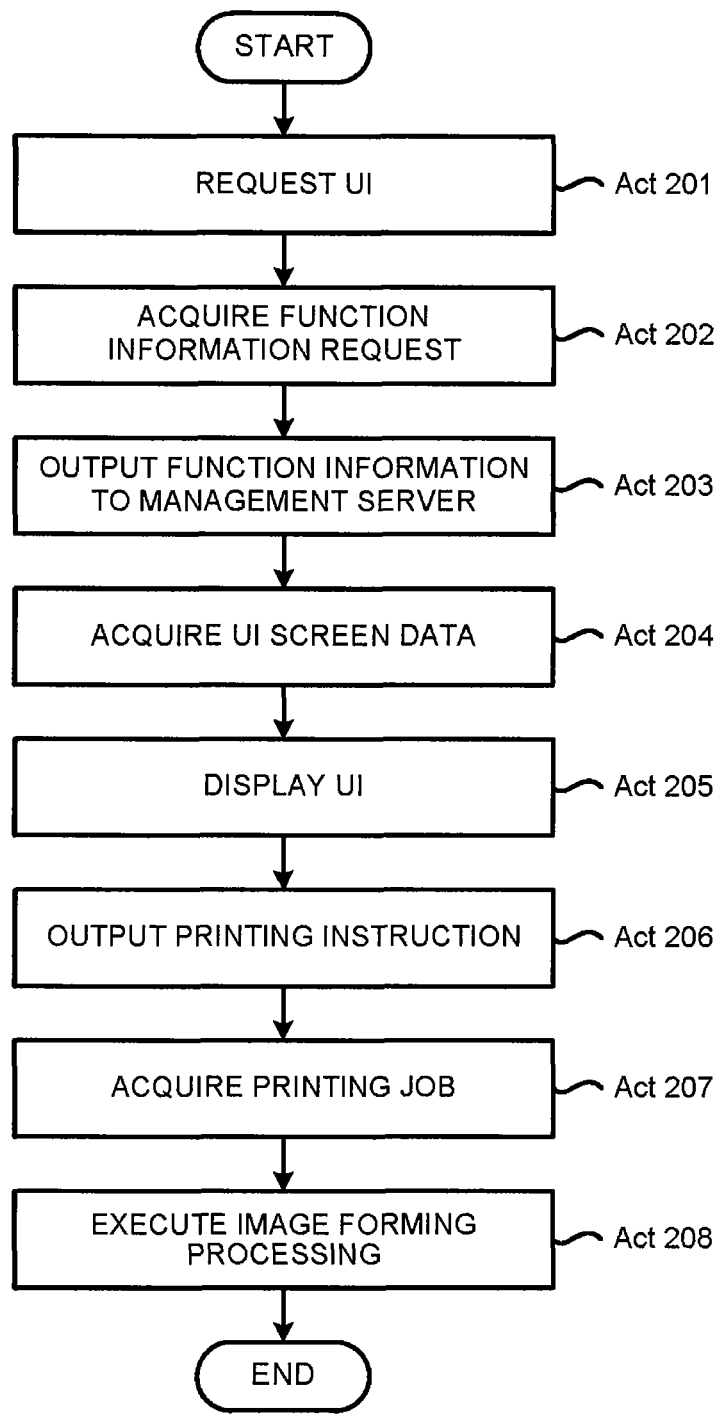
FIG. 6 is a flowchart illustrating a printing processing flow at the image forming apparatus.

Next, the printing processing flow of the image forming apparatus 100 is described. FIG. 6 is a flowchart illustrating the printing processing flow of the image forming apparatus 100.

First, if a document file to be printed is selected on the screen displayed on the display unit 114a based on the information of the document file acquired by the document file information acquisition unit 402, and if an operation is carried out to trigger the display of a print setting screen, then the UI request unit 406 requests the management server 1 for a UI data (ACT 201). In the example shown in FIG. 4, the user selects a document file as the object to be printed from a list of document files, then, the preview screen 42 shown in FIG. 4(a) is displayed on the display unit 114a. Consequentially, if the user touches the button 'print' 44 on the screen, then the UI request unit 406 requests the management server 1 for the UI data in accordance with, for example, HTTP.

Then, the function information provision unit 408 receives the function information request output from the management server 1 if the UI data is requested (ACT 202). The function information request is carried out in accordance with, for example, HTTP.

The function information provision unit 408 confirms functions supported by the image forming apparatus 100 and outputs function information to the management server 1 (ACT 203). The function information is provided in accordance with the protocol used in the reception of the request in ACT 202. The function information is provided in accordance with HTTP if the function information is requested in accordance with HTTP. Additionally, the function information may be provided as HTML data at this time.

Then, the UI acquisition unit 410 acquires the data of a UI corresponding to the functions supported by the image forming apparatus 100 from the management server 1 (ACT 204). The data of the UI sent from the management server 1 as a response to the UI request is sent to the image forming apparatus 100 in accordance with the protocol used in the request for the UI data. In the embodiment, the data of the UI is sent from the management server 1 in the form of HTTP.

The display control unit 404 controls the display unit 114a to display a UI screen for a print setting based on the data of the UI acquired by the UI acquisition unit 410 (ACT 205).

Then, the printing instruction output unit 412 outputs printing instruction to the management server 1 (ACT 206) in a condition that a printing setting operation is carries out on the displayed UI and a printing execution is carried out.

Then, the printing job acquisition unit 414 acquires, from the management server 1, a printing job which is generated based on the document file and printing setting designated in the printing instruction (ACT 207).

Next, the image forming processing control unit 416 controls the printing unit 110 to carry out an image forming processing based on the printing job acquired (ACT 208).

Above is description on the printing processing flow carried out in the image forming apparatus 100 of the printing system according to the embodiment.

According to the embodiment above, in a case where data for a UI screen is provided to the image forming apparatus 100 serving as an actual, print setting processing terminal from the management server 1 for managing a printing system, a UI screen suitable for the functions of the image forming apparatus 100 is provided to the image forming apparatus 100. Therefore, a proper print setting may be carried out in the image forming apparatus to construct a printing system capable of carrying out an image forming processing in accordance with a print setting processing.

In addition, although the printing processing carried out in the image forming apparatus 100 is described in the embodiment, the present invention is not limited to this. For instance, the processing of the embodiment may be applied to the original scanning in the image forming apparatus 100. Specifically, a UI data for a scanning processing corresponding to the functions of the image forming apparatus 100 is provided to the image forming apparatus 100 from the management server 1 and the UI screen is operated in the image forming apparatus 100 to carryout a scanning processing. In the case of a scanning processing, the scanned image data is stored in the document server 200.

Further, in the embodiment, a UI data and function information are requested in accordance with HTTP, however, the present invention is not limited to this, and a protocol can be used as long as a request and a response are made in accordance with the same protocol. For example, a UI request and a function information request may be made in accordance with a SNMP (Simple Network Management Protocol).

Another Embodiment (1)

In the embodiment above, a UI, on which a function not supported by the image forming apparatus 100 cannot be selected, is provided by the UI setting unit 304 of the management server 1, however, an optimal UI may be provided according to whether or not a function is supported.

Figure 7:
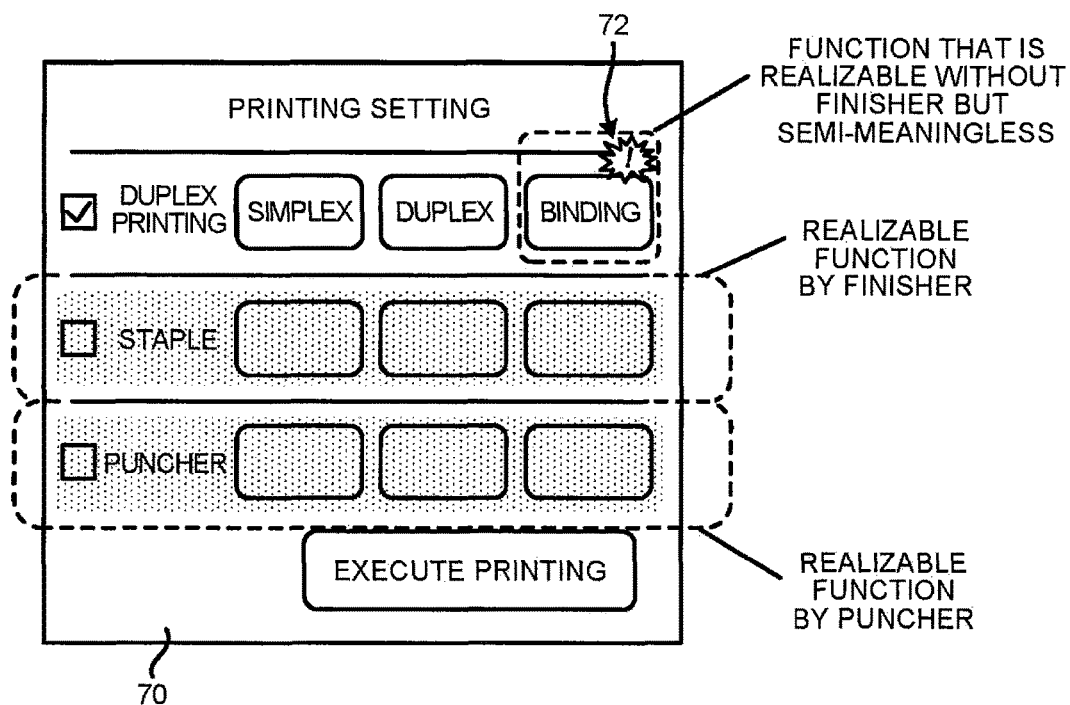
FIG. 7 shows an example of a print setting screen according to another embodiment.

FIG. 7 shows a print setting screen 70 according to this embodiment.

For example, functions of the image forming apparatus 100 are confirmed by the function confirmation unit 302, and as a result, the UI setting unit 304 generates a setting screen on which items 'staple' and 'hole-punch' are grayed out if the image forming apparatus 100 does not support the functions 'staple' and 'hole-punch', as shown in FIG. 7. With respect to the selectable functions, the UI setting unit 304 may display an alert that the functions may not provide a user-expected result based on whether or not the functions are supported by the image forming apparatus 100. In FIG. 7, as an example, an alert display 72 is displayed with respect to a function 'binding' in the exemplary selectable function of duplex printing. As functions 'staple' and 'hole-punch' cannot be selected, the user can be notified that the image forming apparatus 100 cannot carry out a staple processing even if a duplex printing corresponding to book stapling is carried out.

In accordance with the embodiment, a UI screen more suitable for the functions of the image forming apparatus 100 can be provided so that the user can carry out an optimal printing setting.

Another Embodiment (2)

In above embodiments, the management server 1 asks for the functions supported by the image forming apparatus 100. However, the present invention is not limited to this. For example, function information indicating the functions supported by the image forming apparatus 100 may be output to a specific storage area periodically. Then, the management server 1 may request and acquire function information of the image forming apparatus 100 from the specific storage area and generate data of a corresponding UI screen. Another server apparatus (a second management server) different from the management server 1 may be set in the network 130 as a specific storage area to manage function information.

Another Embodiment (3)

In the aforementioned and other embodiments, a printing system including an image forming apparatus 100 and a management server 1 is described, however, the present invention is not limited to this. For example, an object management system including a reader for reading a barcode and a RF (Radio Frequency) tag and a management server for managing the information read is applicable. Specifically, as readers used in the object management system, if there is the readers that readable subject are different (for example, the reader supportive to barcodes, the reader supportive to RF tags and reader supportive to barcodes and RF tags, etc.), the management server requests each reader for function information of the supported reading function and provides data of an optimal UI screen for the readers based on the function information acquired. Thus, the reader only supportive to barcodes cannot read a RF tag. In this way, an optimal UI screen is provided to the reader serving as a processing terminal in the object management system.

In the disclosed embodiments, processing can be accomplished by a computer-executable program, and this program can be realized in a computer-readable memory device. In the disclosed embodiments, a memory device, such as a magnetic disk, a flexible disk, a hard disk, an optical disk (CD-ROM, CD-R, DVD, and so on), an optical magnetic disk (MD and so on), can be used to store instructions for causing a processor or a computer to perform the processes described above. Furthermore, based on an instruction of the program installed from the memory device to the computer, OS (operation system) operating on the computer, or MW (middleware software), such as database management software or network, may execute one part of each processing to realize the embodiments.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A management apparatus, comprising:
a communication interface through which the management apparatus communicates with an external image forming apparatus; and
a processor configured to:
acquire, from the external image forming apparatus through the communication interface, function information indicating one or more functions supported by the external image forming apparatus;
generate, based on the function information, graphical user interface information for displaying a graphical user interface on a display of the external image forming apparatus, such that a function not supported by the external image forming apparatus cannot be selected on the graphical user interface; and
control the communication interface to transmit the generated graphical user interface information to the external image forming apparatus, such that the graphical user interface is displayed on the display of the external image forming apparatus based on the graphical user interface information.

2. The management apparatus according to claim 1, wherein
the processor acquires the function information in response to a request for the graphical user interface information received from the external image forming apparatus, and
the communication interface transmits the graphical user interface information in accordance with a communication protocol that is the same as a communication protocol by which the communication interface receives the request from the external image forming apparatus.

3. The management apparatus according to claim 2, wherein
the request contains identification information of the external image forming apparatus,
the processor acquires the function information by controlling the communication interface to transmit a request for the function information to the external image forming apparatus identified by the identification information and receiving from the external image forming apparatus the function information.

4. The management apparatus according to claim 1, wherein
the function not supported by the external image forming apparatus is grayed out on the graphical user interface that is generated based on the graphical user interface information.

5. The management apparatus according to claim 1, wherein
the function not supported by the external image forming apparatus is not shown on the graphical user interface that is generated based on the graphical user interface information.

6. The management apparatus according to claim 1, wherein
information indicating that the function not supported by the external image forming apparatus cannot be selected is shown on the graphical user interface that is generated based on the graphical user interface information.

7. The management apparatus according to claim 1, wherein
the one or more functions include at least one of a duplex printing function, a stapling function, and a punching function.

8. A method for managing an external image forming apparatus, the method comprising:
acquiring, from the external image forming apparatus through a network, function information indicating one or more functions supported by the external image forming apparatus;
generating, based on the function information, graphical user interface information for displaying a graphical user interface, such that a function not supported by the external image forming apparatus cannot be selected on the graphical user interface; and
transmitting the generated graphical user interface information to the external image forming apparatus through the network, such that the graphical user interface is displayed on the display of the external image forming apparatus based on the graphical user interface information.

9. The method according to claim 8, wherein
the function information is acquired in response to a request for the graphical user interface information received from the external image forming apparatus, and
the graphical user interface information is transmitted in accordance with a communication protocol that is the same as a communication protocol by which the request for the graphical user interface information is received.

10. The method according to claim 8, wherein
the request contains identification information of the external image forming apparatus,
the function information is acquired by transmitting a request for the function information to the external image forming apparatus identified by the identification information and receiving the function information from the external image forming apparatus.

11. The method according to claim 8, wherein
the function not supported by the external image forming apparatus is grayed out on the graphical user interface that is generated based on the graphical user interface information.

12. The method according to claim 8, wherein
the function not supported by the external image forming apparatus is not shown on the graphical user interface that is generated based on the graphical user interface information.

13. The method according to claim 8, wherein
information indicating that the function not supported by the external image forming apparatus cannot be selected is shown on the graphical user interface that is generated based on the graphical user interface information.

14. The method according to claim 8, wherein
the one or more functions include at least one of a duplex printing function, a stapling function, and a punching function.

15. A non-transitory computer readable medium comprising a program that is executable in a computer system to cause the computer system to perform a method for managing an external image forming apparatus, the method including the steps of:
acquiring, from the external image forming apparatus through a network, function information indicating one or more functions supported by the external image forming apparatus;
generating, based on the function information, graphical user interface information for displaying a graphical user interface, such that a function not supported by the external image forming apparatus cannot be selected on the graphical user interface; and
transmitting the generated graphical user interface information to the external image forming apparatus through the network, such that the graphical user interface is displayed on the display of the external image forming apparatus based on the graphical user interface information.

16. The non-transitory computer readable medium of claim 15, wherein
the function information is acquired in response to a request for the graphical user interface information received from the external image forming apparatus, and
the graphical user interface information is transmitted in accordance with a communication protocol that is the same as a communication protocol by which the request for the graphical user interface information is received.

17. The non-transitory computer readable medium of claim 15, wherein
the request contains identification information of the external image forming apparatus,
the function information is acquired by transmitting a request for the function information to the external image forming apparatus identified by the identification information and receiving the function information from the external image forming apparatus.

18. The non-transitory computer readable medium of claim 15, wherein the function not supported by the external image forming apparatus is grayed out on the graphical user interface that is generated based on the graphical user interface information.

19. The non-transitory computer readable medium of claim 15, wherein
the function not supported by the external image forming apparatus is not shown on the graphical user interface that is generated based on the graphical user interface information.

20. The non-transitory computer readable medium of claim 15, wherein
information indicating that the function not supported by the external image forming apparatus cannot be selected is shown on the graphical user interface that is generated based on the graphical user interface information.

\* \* \* \* \*